(12) United States Patent
Qu

(10) Patent No.: US 11,662,024 B2
(45) Date of Patent: May 30, 2023

(54) CARTRIDGE AXIAL DOUBLE-END-FACE SPLIT TYPE MECHANICAL SEAL

(71) Applicant: PARBAT MACHINERY SUZHOU CO. LTD., Jiangsu (CN)

(72) Inventor: Guoping Qu, Jiangsu (CN)

(73) Assignee: AGILESENTRY, LLC, Sugar Land, TX (US)

( * ) Notice: Subject to any disclaimer, the term of this patent is extended or adjusted under 35 U.S.C. 154(b) by 0 days.

(21) Appl. No.: 17/477,366

(22) Filed: Sep. 16, 2021

(65) Prior Publication Data
US 2022/0112955 A1  Apr. 14, 2022

(51) Int. Cl.
*F16J 15/34* (2006.01)

(52) U.S. Cl.
CPC .................... *F16J 15/34* (2013.01)

(58) Field of Classification Search
CPC .......................... F16J 15/3484; F16J 15/3488
See application file for complete search history.

(56) References Cited

U.S. PATENT DOCUMENTS

| | | | | |
|---|---|---|---|---|
| 4,501,429 A | * | 2/1985 | White | F16J 15/3404 277/408 |
| 5,716,054 A | * | 2/1998 | Duffee | F16J 15/3476 277/374 |
| 2010/0038861 A1 | * | 2/2010 | Huang | F16J 15/3484 277/372 |

FOREIGN PATENT DOCUMENTS

GB  2361966 A  * 11/2001  .......... F04D 29/124

\* cited by examiner

*Primary Examiner* — Vishal A Patel

(57) ABSTRACT

Provided is a cartridge axial double-end-face split type mechanical seal, including: a shaft sleeve, a gland, a medium rotary ring, a medium stationary ring, an atmospheric rotary ring, and an atmospheric stationary ring which are all center-split, wherein the shaft sleeve is sleeved on a main shaft, a medium rotary ring groove is disposed at the bottom of the shaft sleeve, the medium rotary ring is fixed in the medium rotary ring groove, the medium stationary ring is sealingly connected with the medium rotary ring, and a first push ring is disposed at the top of the medium stationary ring; an atmospheric rotary ring groove is disposed at the top of the shaft sleeve, the atmospheric rotary ring is fixed in the atmospheric rotary ring groove, the atmospheric stationary ring is sealingly connected with the atmospheric rotary ring.

11 Claims, 1 Drawing Sheet

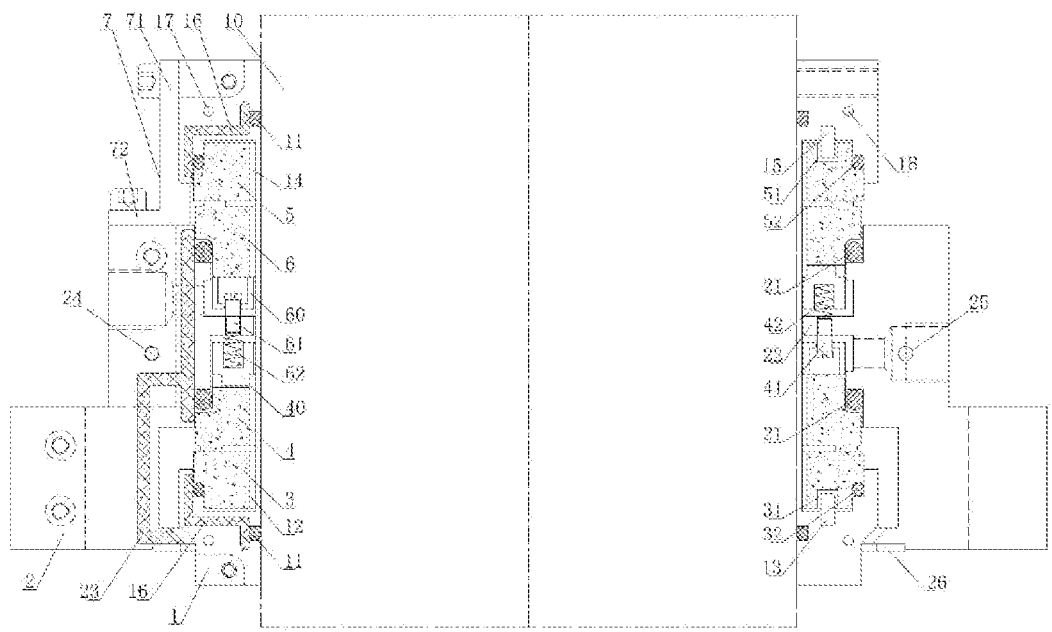

CARTRIDGE AXIAL DOUBLE-END-FACE SPLIT TYPE MECHANICAL SEAL

CROSS-REFERENCE TO RELATED APPLICATION

This application claims priority from the Chinese patent application 202022229923.8 filed Oct. 9, 2020, the content of which is incorporated herein in the entirety by reference.

TECHNICAL FIELD

The present utility model relates to mechanical seals and in particular to a cartridge axial double-end-face split type mechanical seal.

BACKGROUND

The major parts of a traditional mechanical seal include, for example, a rotary ring, a stationary ring, a gland and a shaft sleeve which are all closed cylindrical bodies. During a mounting process, other components can be mounted on a main shaft only after the mechanical seal is sleeved on the main shaft. During a dismounting process, the mechanical seal can be dismounted from the main shaft only after other components are removed from the main shaft. The dismounting and mounting procedures are so tedious that the production efficiency is reduced and extremely high precision mounting abilities of workers are required.

SUMMARY

The object of the present utility model is to provide a cartridge axial double-end-face split type mechanical seal which has ease of mounting and dismounting and high sealing performance.

In order to achieve the above object, the present utility model employs the following technical solution: a cartridge axial double-end-face split type mechanical seal, comprising: a shaft sleeve, a gland, a medium rotary ring, a medium stationary ring, an atmospheric rotary ring, and an atmospheric stationary ring, wherein the shaft sleeve, the gland, the medium rotary ring, the medium stationary ring, the atmospheric rotary ring and the atmospheric stationary ring are all center-split, split pieces of the shaft sleeve are spliced and sleeved on a main shaft, a first sealing ring is disposed between the shaft sleeve and the main shaft, a medium rotary ring groove is disposed at the bottom of the shaft sleeve, split pieces of the medium rotary ring are spliced and fixed in the medium rotary ring groove, a second sealing ring is disposed between the medium rotary ring and the medium rotary ring groove, split pieces of the medium stationary ring are spliced and sealingly connected with the medium rotary ring, and a first push ring is disposed at the top of the medium stationary ring; an atmospheric rotary ring groove is disposed at the top of the shaft sleeve, split pieces of the atmospheric rotary ring are spliced and fixed in the atmospheric rotary ring groove, a third sealing ring is disposed between the atmospheric rotary ring and the atmospheric rotary ring groove, split pieces of the atmospheric stationary ring are spliced and sealingly connected with the atmospheric rotary ring, a second push ring is disposed at the bottom of the atmospheric stationary ring, and an annular cavity is reserved between the first push ring and the second push ring; split pieces of the gland are spliced and sleeved on the shaft sleeve, a fourth sealing ring is disposed between the gland and the medium stationary ring/the atmospheric stationary ring respectively, an inwardly-protruding connection step is disposed on the gland and protruded into the annular cavity between the first push ring and the second push ring, a moving gap is reserved between the connection step and the first push ring/the second push ring respectively, a plurality of first drive pieces and a plurality of first elastic pieces are disposed between the first push ring and the connection step, and a plurality of second drive pieces and a plurality of second elastic pieces are disposed between the second push ring and the connection step.

Furthermore, in the above cartridge axial double-end-face split type mechanical seal, the first push ring is center-split, a plurality of stepped through holes and spring holes are disposed uniformly in a spacing along a circumference in the first push ring, one first drive screw is inserted as a first drive piece through each stepped through hole, the first drive screw protrudes upwardly out of the first push ring and thread-connects with the connection step, one first spring is placed as a first elastic piece in each spring hole, and the top of the first spring is abutted against the connection step; the second push ring is center-split, a plurality of stepped through holes and spring holes are disposed uniformly in a spacing along a circumference in the second push ring, one second drive screw is inserted as a second drive piece through each stepped through hole, the second drive screw protrudes downwardly out of the second push ring and thread-connects with the connection step, one second spring is placed as a second elastic piece in each spring hole, and the bottom of the second spring is abutted against the connection step.

Furthermore, in the above cartridge axial double-end-face split type mechanical seal, a plurality of first cylindrical pins are disposed uniformly in a spacing along a circumference in the medium rotary ring groove, a plurality of first cylindrical holes are disposed uniformly in a spacing along a circumference at the bottom of the medium rotary ring, the medium rotary ring is placed in the medium rotary ring groove, and each first cylindrical pin in the medium rotary ring groove protrudes into each first cylindrical hole on the medium rotary ring respectively; a plurality of second cylindrical pins are disposed uniformly in a spacing along a circumference in the atmospheric rotary ring groove, a plurality of second cylindrical holes are disposed uniformly in a spacing along a circumference at the top of the atmospheric rotary ring, the atmospheric rotary ring is placed in the atmospheric rotary ring groove, and each second cylindrical pin in the atmospheric rotary ring groove protrudes into each second cylindrical hole on the atmospheric rotary ring respectively.

Furthermore, in the above cartridge axial double-end-face split type mechanical seal, a plurality of L-shaped limiting blocks are disposed uniformly in a spacing along a circumference between the shaft sleeve and the gland, a long portion of the L-shaped limiting block is connected with the shaft sleeve through a screw, and a short portion of the L-shaped limiting block is connected with the top of the gland through a screw.

Furthermore, in the above cartridge axial double-end-face split type mechanical seal, a shaft sleeve gasket is disposed between the split pieces of the shaft sleeve, a first locating pin and a first locating hole are disposed between the split pieces of the shaft sleeve, and the split pieces of the shaft sleeve are tightly connected through a screw.

Furthermore, in the above cartridge axial double-end-face split type mechanical seal, a gland gasket is disposed between the split pieces of the gland, a second locating pin and a second locating hole are disposed between the split pieces of the gland, and the split pieces of the gland are tightly connected through a screw.

Furthermore, in the above cartridge axial double-end-face split type mechanical seal, a flat gasket is disposed at the bottom of the gland.

The present utility model has the following advantages: because the shaft sleeve, the gland, the medium rotary ring, the medium stationary ring, the atmospheric rotary ring, and the atmospheric stationary ring are all made into split type structures, it is not required to sleeve the mechanical seal from an end of the main shaft in a case of mounting or replacing the mechanical seal. In this case, it is not required to dismount other components from the main shaft. Therefore, the work load is reduced and the working efficiency is improved. Furthermore, when the split type mechanical seal bears a medium pressure, a contact pressure between the medium rotary ring and the medium stationary ring/the inner stationary ring increases along with increase of a pressure of the sealed medium, thus improving a resistance of the sealed medium flowing out of a sealing surface. The additional atmospheric rotary ring and atmospheric stationary ring sealingly connected with each other can increase the sealing performance and service life of the mechanical seal and also improve the anti-cavitation capability of the mechanical seal, thereby increasing the application scope of the mechanical seal.

BRIEF DESCRIPTIONS OF THE DRAWINGS

FIG. 1 is a sectional structural diagram of a cartridge axial double-end-face split type mechanical seal according to the present utility model.

DETAILED DESCRIPTIONS OF EMBODIMENTS

The technical solution of the present utility model will be further described below in combination with accompanying drawings and specific preferred embodiments.

As shown in FIG. 1, the present utility model provides a cartridge axial double-end-face split type mechanical seal, comprising: a shaft sleeve 1, a gland 2, a medium rotary ring 3, a medium stationary ring 4, an atmospheric rotary ring 5, and an atmospheric stationary ring 6, wherein the shaft sleeve 1, the gland 2, the medium rotary ring 3, the medium stationary ring 4, the atmospheric rotary ring 5 and the atmospheric stationary ring 6 are all center-split, split pieces of the shaft sleeve 1 are spliced and sleeved on a main shaft 10, a first sealing ring 11 is disposed between the shaft sleeve 1 and the main shaft 10, a medium rotary ring groove 12 is disposed at the bottom of the shaft sleeve 1, a plurality of first cylindrical pins 13 are disposed uniformly in a spacing along a circumference in the medium rotary ring groove 12, a plurality of first cylindrical holes 31 are disposed uniformly in a spacing along a circumference at the bottom of the medium rotary ring 3, split pieces of the medium rotary ring 3 are spliced and placed in the medium rotary ring groove, each first cylindrical pin 13 in the medium rotary ring groove 12 protrudes into each first cylindrical hole 31 on the medium rotary ring 3 respectively, a second sealing ring 32 is disposed between the medium rotary ring 3 and the medium rotary ring groove 12, split pieces of the medium stationary ring 4 are spliced and sealingly connected with the medium rotary ring 3, a first push ring 40 is disposed at the top of the medium stationary ring 4, and the first push ring 40 is center-split; an atmospheric rotary ring groove 14 is disposed at the top of the shaft sleeve 1, a plurality of second cylindrical pins 15 are disposed uniformly in a spacing along a circumference in the atmospheric rotary ring groove 14, a plurality of second cylindrical holes 51 are disposed uniformly in a spacing along a circumference at the top of the atmospheric rotary ring 5, split pieces of the atmospheric rotary ring 5 are spliced and placed in the atmospheric rotary ring groove 14, each second cylindrical pin 15 in the atmospheric rotary ring groove 14 protrudes into each second cylindrical hole 51 on the atmospheric rotary ring 5 respectively, a third sealing ring 52 is disposed between the atmospheric rotary ring 5 and the atmospheric rotary ring groove 15, split pieces of the atmospheric stationary ring 6 are spliced and sealingly connected with the atmospheric rotary ring 5, a second push ring 60 is disposed at the bottom of the atmospheric stationary ring 6, the second push ring 60 is center-split, and an annular cavity is reserved between the first push ring 40 and the second push ring 60; split pieces of the gland 2 are spliced and sleeved on the shaft sleeve 1, a fourth sealing ring 21 is disposed between the gland and the medium stationary ring 4/the atmospheric stationary ring 6 respectively, an inwardly-protruding connection step 22 is disposed on the gland 2 and protruded into the annular cavity between the first push ring 40 and the second push ring 60, a moving gap is reserved between the connection step 22 and the first push ring 40/the second push ring 60 respectively, a plurality of stepped through holes and spring holes are disposed uniformly in a spacing along a circumference in the first push ring 40, one first drive screw 41 is inserted as a first drive piece through each stepped through hole, the first drive screw 41 protrudes upwardly out of the first push ring 40 and thread-connects with the connection step 22, one first spring 42 is placed as a first elastic piece in each spring hole, and the top of the first spring 42 is abutted against the connection step 22, a plurality of stepped through holes and spring holes are disposed uniformly in a spacing along a circumference in the second push ring 60, one second drive screw 61 is inserted as a second drive piece through each stepped through hole, the second drive screw 61 protrudes downwardly out of the second push ring 60 and thread-connects with the connection step 22, one second spring 62 is placed as a second elastic piece in each spring hole, and the bottom of the second spring 62 is abutted against the connection step 22.

In this embodiment, a plurality of L-shaped limiting blocks 7 are disposed uniformly in a spacing along a circumference between the shaft sleeve 1 and the gland 2, a long portion 71 of the L-shaped limiting block 7 is connected with the shaft sleeve 1 through a screw, and a short portion 72 of the L-shaped limiting block 7 is connected with the top of the gland 2 through a screw.

In this embodiment, a shaft sleeve gasket 16 is disposed between the split pieces of the shaft sleeve 1, a first locating pin 17 and a first locating hole 18 are disposed between the split pieces of the shaft sleeve 1, and the split pieces of the shaft sleeve 1 are tightly connected through a screw. A gland gasket 23 is disposed between the split pieces of the gland 2, a second locating pin 24 and a second locating hole 25 are disposed between the split pieces of the gland 2, and the split pieces of the gland 2 are tightly connected through a screw. A flat piece 26 is disposed at the bottom of the gland 2.

The present utility model has the following advantages: because the shaft sleeve, the gland, the medium rotary ring, the medium stationary ring, the atmospheric rotary ring, and the atmospheric stationary ring are all made into split type structures, it is not required to sleeve the mechanical seal from an end of the main shaft in a case of mounting or replacing the mechanical seal. In this case, it is not required to dismount other components from the main shaft. Therefore, the work load is reduced and the working efficiency is improved. Furthermore, when the split type mechanical seal bears a medium pressure, a contact pressure between the medium rotary ring and the medium stationary ring/the inner stationary ring increases along with increase of a pressure of the sealed medium, thus improving a resistance of the sealed medium flowing out of a sealing surface. The additional atmospheric rotary ring and atmospheric stationary ring sealingly connected with each other can increase the sealing performance and service life of the mechanical seal and also improve the anti-cavitation capability of the mechanical seal, thereby increasing the application scope of the mechanical seal.

What is claimed is:

1. A cartridge axial double-end-face split mechanical seal, comprising:
   a shaft sleeve (1);
   a gland (2),
   a medium rotary ring (3),
   a medium stationary ring (4),
   an atmospheric rotary ring (5), and
   an atmospheric stationary ring (6), wherein
   the shaft sleeve (1), the gland (2), the medium rotary ring (3), the medium stationary ring (4), the atmospheric rotary ring (5) and the atmospheric stationary ring (6) are all center-split,
   split pieces of the shaft sleeve (2) are spliced and sleeved on a main shaft (10),
   a first sealing ring (11) is disposed between the shaft sleeve (1) and the main shaft (10),
   a medium rotary ring groove (12) is disposed at the bottom of the shaft sleeve (1) and extending from the medium rotary ring (3) to the medium stationary ring (4),
   a plurality of first cylindrical pins (13) are disposed uniformly in a spacing along a circumference in the medium rotary ring groove (12), and each first cylindrical pin (13) in the medium rotary ring groove (12) protrudes into each first cylindrical hole (31) on the medium rotary ring (3) respectively,
   split pieces of the medium rotary ring (3) are spliced and fixed in the medium rotary ring groove (12),
   a second sealing ring (32) is disposed between the medium rotary ring (3) and the medium rotary ring groove (12),
   split pieces of the medium stationary ring (4) are spliced and sealingly connected with the medium rotary ring (3),
   a first push ring (40) is disposed at the top of the medium stationary ring (4); and the first push ring (40) is center-split;
   an atmospheric rotary ring groove (14) is disposed at the top of the shaft sleeve (1) and extending from the atmospheric rotary ring (5) to the atmospheric stationary ring (6), and a plurality of second cylindrical pins (15) are disposed uniformly in a spacing along a circumference in the atmospheric rotary ring groove (14),
   split pieces of the atmospheric rotary ring (5) are spliced and fixed in the atmospheric rotary ring groove (14), and each second cylindrical pin (15) in the atmospheric rotary ring groove (14) protrudes into each second cylindrical hole (51) on the atmospheric rotary ring (5) respectively,
   a third sealing ring (52) is disposed between the atmospheric rotary ring (5) and the atmospheric rotary ring groove (15),
   split pieces of the atmospheric stationary ring (6) are spliced and sealingly connected with the atmospheric rotary ring (5),
   a second push ring (60) is disposed at the bottom of the atmospheric stationary ring (6), and the second push ring (60) is center-split,
   an annular cavity is reserved between the first push ring (40) and the second push ring (60);
   split pieces of the gland (2) are spliced and sleeved on the shaft sleeve (1),
   a fourth sealing ring (21) is disposed between the gland (2) and the medium stationary ring (4)/the atmospheric stationary ring (6), respectively,
   an inwardly-protruding connection step (22) is disposed on the gland (2) and protruded into the annular cavity between the first push ring (40) and the second push ring (60),
   a moving gap is reserved between the connection step (22) and the first push ring (40)/the second push ring (60) respectively,
   a plurality of first drive pieces (41) and a plurality of first elastic pieces (42) are disposed between the first push ring (40) and the connection step (22), a first plurality of stepped through holes and spring holes are disposed uniformly in a spacing along a circumference in the first push ring (40), at least one of the first drive pieces (41) is inserted through one of the first plurality of stepped through holes, the at least one of the first drive pieces (41) protrudes upwardly out of the first push ring (40) and thread-connects with the connection step (22), one of the plurality of first elastic pieces (42) is placed in one of the spring holes, and the top of the one of the first elastic pieces (42) is abutted against the connection step (22) and
   a plurality of second drive pieces (61) and a plurality of second elastic pieces (62) are disposed between the second push ring (60) and the connection step (22); and at least one of the plurality of second drive pieces (61) is inserted through each stepped through hole, and protrudes downwardly out of the second push ring (60) and thread-connects with the connection step (22), at least one of the plurality of second elastic pieces (62) is placed in a spring hole, and the bottom of the at least the one of the plurality of second elastic pieces (62) is abutted against the connection step (22).

2. The cartridge axial double-end-face split mechanical seal according to claim 1, wherein a a plurality of first cylindrical holes are disposed uniformly in a spacing along a circumference at the bottom of the medium rotary ring (3), the medium rotary ring (3) is placed in the medium rotary ring groove (12), and each first cylindrical pin in the medium rotary ring groove (12) protrudes into each first cylindrical hole on the medium rotary ring (3) respectively; a plurality of second cylindrical holes are disposed uniformly in a spacing along a circumference at the top of the atmospheric rotary ring (5), the atmospheric rotary ring (5) is placed in the atmospheric rotary ring groove (14), and each second cylindrical pin in the atmospheric rotary ring groove (14) protrudes into each second cylindrical hole on the atmospheric rotary ring (5) respectively.

3. The cartridge axial double-end-face split mechanical seal according to claim 1, wherein a plurality of L-shaped limiting blocks are disposed uniformly in a spacing along a circumference between the shaft sleeve (1) and the gland (2), a long portion of the L-shaped limiting block is connected with the shaft sleeve (1) through a screw, and a short portion of the L-shaped limiting block is connected with the top of the gland (2) through a screw.

4. The cartridge axial double-end-face split mechanical seal according to claim 1, wherein a shaft sleeve (1) gasket (16) is disposed between the split pieces of the shaft sleeve (1), a first locating pin and a first locating hole are disposed between the split pieces of the shaft sleeve (1), and the split pieces of the shaft sleeve (1) are tightly connected through a screw.

5. The cartridge axial double-end-face split mechanical seal according to claim 1, wherein a gland (2) gasket (16) is disposed between the split pieces of the gland (2), a second locating pin and a second locating hole are disposed between the split pieces of the gland (2), and the split pieces of the gland (2) are tightly connected through a screw.

6. The cartridge axial double-end-face split mechanical seal according to claim 1, wherein a flat gasket (16) is disposed at the bottom of the gland (2).

7. The cartridge axial double-end-face split mechanical seal according to claim 2, wherein a plurality of first cylindrical pins are disposed uniformly in a spacing along a circumference in the medium rotary ring groove (12), a plurality of first cylindrical holes are disposed uniformly in a spacing along a circumference at the bottom of the medium rotary ring (3), the medium rotary ring (3) is placed in the medium rotary ring groove (12), and each first cylindrical pin in the medium rotary ring groove (12) protrudes into each first cylindrical hole on the medium rotary ring (3) respectively; a plurality of second cylindrical pins are disposed uniformly in a spacing along a circumference in the atmospheric rotary ring groove (14), a plurality of second cylindrical holes are disposed uniformly in a spacing along a circumference at the top of the atmospheric rotary ring (5), the atmospheric rotary ring (5) is placed in the atmospheric rotary ring groove (14), and each second cylindrical pin in the atmospheric rotary ring groove (14) protrudes into each second cylindrical hole on the atmospheric rotary ring (5) respectively.

8. The cartridge axial double-end-face split mechanical seal according to claim 2, wherein a plurality of L-shaped limiting blocks are disposed uniformly in a spacing along a circumference between the shaft sleeve (1) and the gland (2), a long portion of the L-shaped limiting block is connected with the shaft sleeve (1) through a screw, and a short portion of the L-shaped limiting block is connected with the top of the gland (2) through a screw.

9. The cartridge axial double-end-face split mechanical seal according to claim 2, wherein a shaft sleeve (1) gasket (16) is disposed between the split pieces of the shaft sleeve (1), a first locating pin and a first locating hole are disposed between the split pieces of the shaft sleeve (1), and the split pieces of the shaft sleeve (1) are tightly connected through a screw.

10. The cartridge axial double-end-face split mechanical seal according to claim 2, wherein a gland (2) gasket (16) is disposed between the split pieces of the gland (2), a second locating pin and a second locating hole are disposed between the split pieces of the gland (2), and the split pieces of the are tightly connected through a screw.

11. The cartridge axial double-end-face split mechanical seal according to claim 2, wherein a flat gasket (16) is disposed at the bottom of the gland (2) (2).

\* \* \* \* \*